United States Patent
Sasaki et al.

[11] Patent Number: 5,994,253
[45] Date of Patent: Nov. 30, 1999

[54] DIELECTRIC CERAMIC COMPOSITION AND CERAMIC ELECTRONIC PART WITH SAME

[75] Inventors: Nobuhiro Sasaki; Katsuyuki Horie; Hirokazu Chazono, all of Tokyo, Japan

[73] Assignee: Taiyo Yuden Co., Ltd., Tokyo, Japan

[21] Appl. No.: 09/110,417

[22] Filed: Jul. 6, 1998

[30] Foreign Application Priority Data

Jul. 22, 1997 [JP] Japan ................................. 9-211281

[51] Int. Cl.⁶ .................................................. C04B 35/468
[52] U.S. Cl. ............................................ 501/139; 501/138
[58] Field of Search ..................................... 501/138, 139

[56] References Cited

U.S. PATENT DOCUMENTS

| | | | |
|---|---|---|---|
| 5,310,710 | 5/1994 | Takase et al. | 501/139 |
| 5,350,721 | 9/1994 | Abe et al. | 501/139 |
| 5,556,818 | 9/1996 | Kohler et al. | 501/139 |
| 5,650,368 | 7/1997 | Tateishi et al. | 501/139 |
| 5,688,732 | 11/1997 | Park et al. | 501/139 |
| 5,827,792 | 10/1998 | Fukuda et al. | 501/139 |

FOREIGN PATENT DOCUMENTS

| | | | |
|---|---|---|---|
| 4-359806 | 12/1992 | Japan | H01B 3/12 |
| 4-359810 | 12/1992 | Japan | H01B 3/12 |

*Primary Examiner*—Karl Group
*Attorney, Agent, or Firm*—Ronald R. Snider; Snider & Associates

[57] ABSTRACT

A dielectric ceramic composition is comprised of a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn, in which the crystal structure phase of the tungsten bronze form is formed with a limited amount of a compound oxide of Ba, Nd and Ti as a basic component and contains a limited amount of each of an oxide of at least Bi, Pb, Zn and Si. The dielectric ceramic composition can be fired at a temperature of 920° C. or lower and sintered forming into a ceramic electronic part which has remarkably high dielectric characteristics, such as the dielectric constant of 60 or higher, the Q factor of 1,000 or higher, and the temperature coefficient $\tau\epsilon r$ of the relative dielectric constant $\epsilon r$ of ±60 ppm/° C. or smaller. The ceramic electronic parts for high frequency are further provided with high electrical features and prepared at low costs.

3 Claims, 1 Drawing Sheet

DIELECTRIC CERAMIC COMPOSITION AND CERAMIC ELECTRONIC PART WITH SAME

CROSS-REFERENCE

This application claims the priority of Japanese Patent Application No. H9-211281, filed on Jul 22, 1997, which is incorporated herein by reference.

BACKGROUND OF THE INVENTION

1. Field of the Invention

The present invention relates to a dielectric ceramic composition and a ceramic electronic part using the same. More particularly, the present invention relates to a dielectric ceramic composition suitable as a dielectric material of a ceramic electronic part for use in a high frequency region and to a ceramic electronic part using the dielectric ceramic composition.

2. Description of the Related Art

Ceramic electronic parts such as ceramic capacitors, filters, resonators and so on are provided with a dielectric layer which is formed by a firing step. The firing in the firing step is usually carried out at a high temperature over 1,000° C. or higher. A filter medium for a firing oven, a sagger or a setter may be worn off and a firing oven may entail the high cost of electricity for heating the firing oven at a high temperature. As a consequence, the cost of manufacturing ceramic electronic parts may become expensive. Therefore, a variety of techniques have hitherto been proposed to provide processes for preparing dielectric ceramic compositions which can sustain various electrical features at desired levels even if they have been firing at a relatively low temperature.

For instance, Japanese Patent Unexamined Publication No. 4-359,806 discloses a dielectric ceramic composition having a composition of component systems consisting of a $BaTiO_3$-$Nd_2O_3$-$Sm_2O_3$-$TiO_2$ system, $Al_2O_3$, and a $SiO_2$-$PbO$-$CaO$-$B_2O_3$-$Na_2O$-$MgO$-$K_2O$ system and having a limited rate of an amount of each component.

The dielectric ceramic composition disclosed in the prior publication can be fired at a temperature as low as 1,000° C. or lower and it can sustain its remarkable features that a Q factor and a specific resistance are high at the dielectric constant of 10 or higher even under firing conditions under a partial oxygen pressure low enough to cause no oxidation of copper and that a rate of a variation in an electrostatic capacity with temperature is very small. Further, the composition disclosed therein can provide a dielectric filter highly suitable for a high frequency at low manufacturing costs and with improved durability because it uses a base metal such as copper or the like as a conductive material. Moreover, the prior art technology can realize a process for the preparation of such a dielectric filter.

Further, for instance, Japanese Patent Unexamined Publication No. 4-359,810 discloses a dielectric ceramic composition having a composition of component systems consisting of $Al_2O_3$, a $SiO_2$-$PbO$-$CaO$-$B_2O_3$-$Na_2O$-$MgO$-$K_2O$ system, and a $BaO$-$TiO_2$ system or a $BaO$-$Nb_2O_3$-$TiO_2$ system or a $BaO$-$Sm_2O_3$-$TiO_2$ system and having a limited rate of an amount of each component.

Likewise, the dielectric ceramic composition disclosed in the prior publication can be fired at a temperature as low as 1,000° C. or lower and it can sustain its remarkable features that a Q factor and a specific resistance are high at the dielectric constant of 10 or higher even under firing conditions at a partial oxygen pressure low enough to cause no oxidation of copper and that a rate of a variation in an electrostatic capacity with temperature is very small. Further, the composition disclosed therein can provide a dielectric filter highly suitable for a high frequency at low manufacturing costs and with improved durability because it uses a base metal such as copper or the like as a conductive material. Moreover, it can realize a process for the preparation of such a dielectric filter.

Firing those prior art dielectric ceramic compositions at the temperature as low as 1,000° C. or lower, however, cannot be said to be sufficiently low in terms of the firing temperature in order to be applied to ceramic electronic parts because the upper limit of the firing temperature should be approximately 920° C. as long as the use of a metallic material having a low melting point, such as Ag or the like, or a base metal material is used as a material for an inner electrode, etc. is taken into account.

SUMMARY OF THE INVENTION

Therefore, the present invention has the object to provide a dielectric ceramic composition having desired electrical characteristics even when it is fired at a temperature as low as 920° C. or lower.

The present invention has further an object to provide a ceramic electronic part prepared with such a dielectric ceramic composition.

In order to achieve the object, the present invention according to an aspect provides a dielectric ceramic composition comprising a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn.

The present invention according to another aspect provides a ceramic electronic part prepared from a dielectric ceramic composition comprising a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn.

Other objects, features and advantages of the present invention may become apparent in the course of the description that follows, with reference to the accompanying drawings.

DESCRIPTION OF THE PREFERRED EMBODIMENTS

Figure 1:
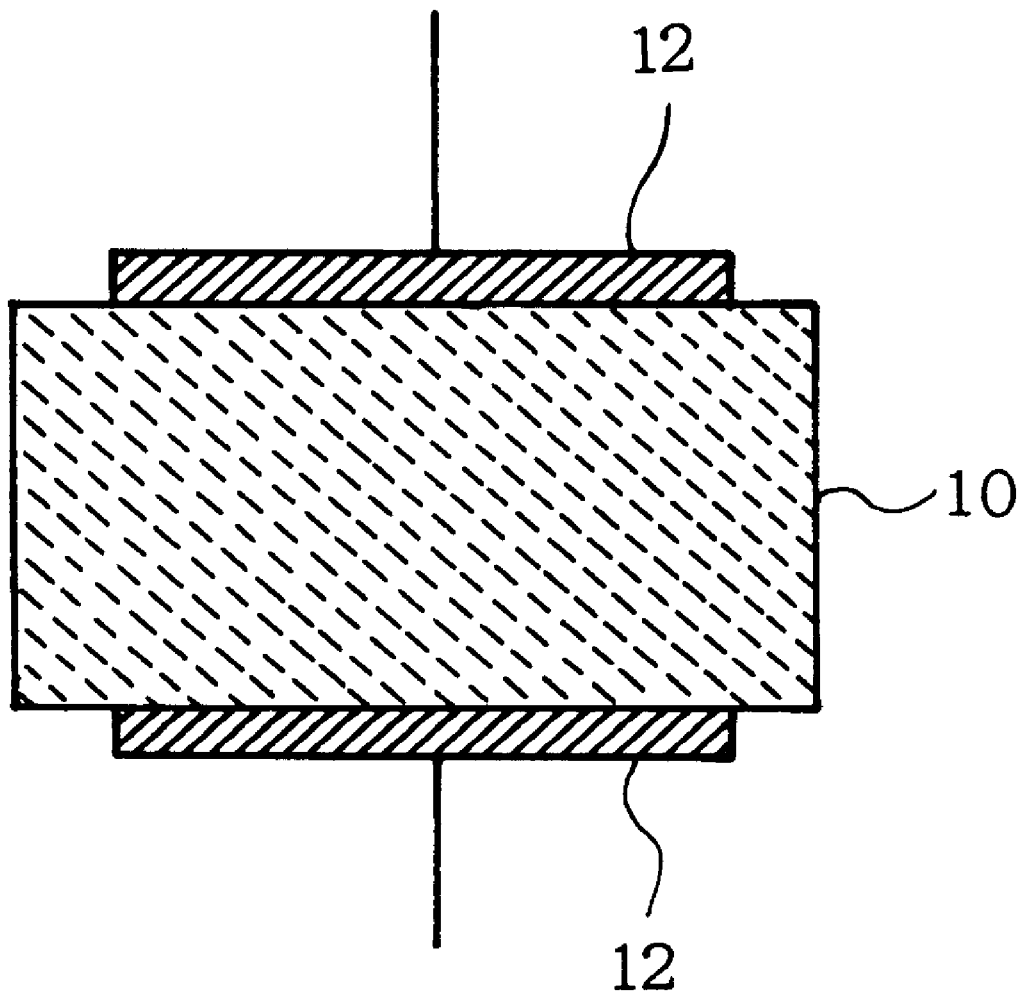
FIG. 1 is a schematic representation showing a ceramic capacitor in accordance with an embodiment of the present invention.

The dielectric ceramic composition according to the present invention comprises a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn.

The crystal structure phase of the tungsten bronze form in the dielectric ceramic composition according to the present invention contains a compound oxide of Ba, Nd and Ti as a basic component and at least an oxide of each of Bi, Pb, Zn and Si. The basic structure of the crystal structure phase of the tungsten bronze form may be $BaNd_2Ti_4O_{12}$ or $BaNd_2Ti_5O_{12}$. The crystal structure phase of the tungsten bronze form may be comprised of any other structure as long as it comprises a compound oxide of Ba, Nd and Ti.

The rate of the crystal structure phase of the tungsten bronze form in the dielectric ceramic composition according to the present invention, when represented in X% by mole, may amount to preferably X=80%–98% by mole, assuming that the rate of the titanate-barium phase is represented in Y% by mole and that the total of X% and Y% by mole is set to 100% by mole.

The reason for setting the rate of the crystal structure phase of the tungsten bronze form to X=80%–98% by mole is because the sintering may not be performed by firing at a temperature lower than 920° C. or lower, on the one hand, if the rate thereof is set to lower than 80% by mole and the dielectric constant does not become 60 or higher, on the other hand, if the rate thereof is set to over 98% by mole.

It is further preferred that the rate of the oxide of Bi to be contained in the crystal structure phase of the tungsten bronze form be set to 1% to 5% by mole, the rate of the oxide of Pb to 1% to 6% by mole, the rate of the oxide of Zn to 2% to 11% by mole, and the rate of the oxide of Si to 2% to 11% by mole.

The reasons for setting the rate of the oxide of Bi in the crystal structure phase of the tungsten bronze form to 1% to 5% by mole are, for instance, because the dielectric constant εr may not reach 60 or higher, on the one hand, if the rate of the Bi oxide is smaller than 1% by mole and a temperature feature of the electrostatic constant τε may become in the range within ±60 ppm/° C., on the other, if the rate of the Bi oxide is larger than 5% by mole.

The rate of the oxide of Pb is set to 1% to 6% by mole, for instance, because the dielectric constant εr may not reach 60 or higher, on the one hand, if the rate of the Pb oxide is smaller than 1% by mole and a temperature feature of the electrostatic constant τε may become in the range of ±60 ppm/°C., on the other, if the rate of the Pb oxide is larger than 6% by mole.

The reasons for setting the rate of the oxide of Zn in the crystal structure phase of the tungsten bronze form to 2% to 11% by mole are, for instance, because the composition cannot be sintered by firing at a temperature lower than 920° C., on the one hand, if the rate of the Zn oxide is smaller than 2% by mole and the dielectric constant εr may not reach 60 or higher or the Q factor may not reach 1,000 or higher, on the other, if the rate of the Zn oxide is larger than 11% by mole.

The rate of the oxide of Si therein is set to 2% to 11% by mole are, for instance, because the sintering cannot be performed by firing at a temperature of 920° C. or lower, on the one hand, if the rate of the Si oxide is smaller than 2% by mole and the dielectric constant εr may not reach 60 or higher or the Q factor may not reach 1,000 or higher, on the other, if the rate of the Si oxide is larger than 11% by mole.

Further, the rates of the B oxide, the Ag oxide and the Mn oxide constituting the fine crystal phase may be in the range of from 1% to 6% by mole, from 1% to 6% by mole and from 1% to 5% by mole, respectively, with respect to the combined amounts of the crystal structure phase of the tungsten bronze form and the titanate-barium phase.

The rate of the B oxide in the fine crystal phase is set to 1% to 6% by mole are, for instance, because the composition cannot be sintered by firing at a temperature of 920° C. or lower, on the one hand, if the rate of the B oxide is smaller than 1% by mole and the dielectric constant εr may not reach 60 or higher or the Q factor may not reach 1,000 or higher, on the other, if the rate of the B oxide is larger than 6% by mole.

The reasons for setting the rate of the oxide of Ag therein to 2% to 11% by mole are, for instance, because the composition cannot be sintered by firing at a temperature of 920° C. or lower, on the one hand, if the rate of the Ag oxide is smaller than 1% by mole and the dielectric constant εr may not reach 60 or higher or the Q factor may not reach 1,000 or higher, on the other, if the rate of the Ag oxide is larger than 6% by mole.

The rate of the Mn oxide in the fine crystal phase is set to 1% to 5% by mole are, for instance, because the Q factor may not reach 1,000 or higher, on the one hand, if the rate of the Mn oxide is smaller than 1% by mole and the dielectric constant εr may not reach 60 or higher, on the other, if the rate of the Mn oxide is larger than 5% by mole.

The ceramic electronic parts according to the present invention are prepared from the dielectric ceramic compositions and may include, for example, ceramic capacitors, filters, resonators, etc, each of a monolayer or multilayer structure.

The present invention will be described in more detail by way of examples with reference to the accompanying drawing.

EXAMPLES

Powders of each of the following compounds, i.e. BaO, $Nd_2O_3$, $TiO_2$, $Bi_2O_3$, $Pb_3O_4$, ZnO, $SiO_2$, $B_2O_3$, $Ag_2O$, and $Mn_3O_4$ were weighed in the amount as samples in Example Nos. 1 to 45, inclusive, as shown in Tables 1-1 and 1-2 below.

TABLE 1-1

| Ex. Nos. | $Nd_2O_3$ | $TiO_2$ | $BaTiO_3$ | $Bi_2O_3$ | $Pb_3O_4$ | ZnO | $SiO_2$ | $B_2O_3$ | $Ag_2O$ | $Mn_3O_4$ |
|---|---|---|---|---|---|---|---|---|---|---|
| 1 | 13.77 | 53.11 | 15.74 | 0.98 | 0.98 | 5.90 | 5.90 | 1.48 | 1.48 | 0.66 |
| 2* | 10.68 | 44.84 | 25.62 | 1.07 | 1.07 | 6.41 | 6.41 | 1.60 | 1.60 | 0.70 |
| 3* | 16.41 | 60.18 | 7.29 | 0.91 | 0.91 | 5.47 | 5.47 | 1.37 | 1.37 | 0.62 |
| 4 | 11.15 | 37.92 | 31.23 | 1.12 | 1.12 | 6.69 | 6.69 | 1.67 | 1.67 | 0.74 |
| 5 | 17.36 | 52.09 | 13.50 | 0.96 | 0.96 | 5.79 | 5.79 | 1.45 | 1.45 | 0.65 |
| 6 | 13.84 | 53.38 | 15.82 | 0.49 | 0.99 | 5.93 | 5.93 | 1.48 | 1.48 | 0.66 |
| 7 | 12.04 | 52.17 | 18.06 | 1.00 | 1.00 | 6.02 | 6.02 | 1.51 | 1.51 | 0.67 |
| 8 | 13.31 | 62.11 | 17.74 | 0.55 | 0.37 | 2.22 | 2.22 | 0.55 | 0.55 | 0.38 |
| 9* | 12.37 | 45.36 | 22.68 | 1.03 | 1.03 | 6.19 | 6.19 | 1.55 | 1.55 | 2.05 |
| 10 | 12.29 | 49.15 | 20.48 | 1.02 | 1.02 | 6.14 | 6.14 | 1.54 | 1.54 | 0.68 |
| 11 | 15.53 | 54.37 | 13.59 | 0.97 | 0.32 | 5.83 | 5.83 | 1.46 | 1.46 | 0.64 |
| 12 | 15.14 | 56.78 | 11.36 | 0.95 | 0.95 | 5.68 | 5.68 | 1.42 | 1.42 | 0.62 |
| 13 | 14.01 | 42.04 | 15.77 | 2.19 | 1.75 | 8.76 | 8.76 | 2.63 | 2.63 | 1.46 |
| 14* | 14.05 | 46.15 | 20.07 | 1.00 | 1.00 | 6.02 | 6.02 | 1.51 | 3.51 | 0.67 |
| 15 | 16.05 | 48.16 | 18.06 | 1.00 | 1.00 | 6.02 | 6.02 | 1.51 | 1.51 | 0.67 |
| 16 | 14.33 | 55.29 | 16.38 | 1.02 | 1.02 | 2.05 | 6.14 | 1.54 | 1.54 | 0.69 |
| 17 | 14.19 | 46.62 | 20.27 | 1.01 | 1.01 | 6.08 | 6.08 | 1.52 | 1.52 | 1.70 |
| 18* | 13.34 | 59.09 | 11.44 | 0.24 | 0.95 | 5.72 | 5.72 | 1.43 | 1.43 | 0.64 |
| 19* | 12.81 | 38.43 | 27.76 | 1.07 | 1.07 | 6.41 | 6.41 | 3.74 | 1.60 | 0.70 |
| 20 | 14.05 | 50.17 | 18.06 | 1.00 | 1.00 | 6.02 | 6.02 | 1.51 | 1.51 | 0.66 |

TABLE 1-1-continued

| Ex. Nos. | Nd$_2$O$_3$ | TiO$_2$ | BaTiO$_3$ | Bi$_2$O$_3$ | Pb$_3$O$_4$ | ZnO | SiO$_2$ | B$_2$O$_3$ | Ag$_2$O | Mn$_3$O$_4$ |
|---|---|---|---|---|---|---|---|---|---|---|
| 21 | 13.09 | 48.00 | 24.00 | 1.09 | 1.09 | 6.55 | 2.18 | 1.64 | 1.64 | 0.72 |
| 22 | 15.21 | 53.25 | 13.31 | 0.95 | 0.95 | 5.71 | 5.71 | 1.43 | 2.85 | 0.63 |
| 23* | 11.90 | 55.54 | 15.87 | 0.99 | 0.17 | 5.95 | 5.95 | 1.49 | 1.49 | 0.65 |
| 24* | 11.36 | 49.21 | 17.03 | 0.95 | 0.95 | 5.68 | 11.36 | 1.42 | 1.42 | 0.62 |

TABLE 1-2

| Ex. Nos. | Nd$_2$O$_3$ | TiO$_2$ | BaTiO$_3$ | Bi$_2$O$_3$ | Pb$_3$O$_4$ | ZnO | SiO$_2$ | B$_2$O$_3$ | Ag$_2$O | Mn$_3$O$_4$ |
|---|---|---|---|---|---|---|---|---|---|---|
| 25 | 11.80 | 55.08 | 15.74 | 0.98 | 0.98 | 5.90 | 5.90 | 1.48 | 1.48 | 0.66 |
| 26 | 15.58 | 54.55 | 13.64 | 0.97 | 0.97 | 5.84 | 5.84 | 0.49 | 1.46 | 0.66 |
| 27 | 14.93 | 55.99 | 11.20 | 0.93 | 0.93 | 5.60 | 5.60 | 2.80 | 1.40 | 0.62 |
| 28* | 16.22 | 56.76 | 14.19 | 1.01 | 1.01 | 6.08 | 1.52 | 1.52 | 1.52 | 0.68 |
| 29* | 15.14 | 45.43 | 17.03 | 0.95 | 0.95 | 11.36 | 5.68 | 1.42 | 1.42 | 0.62 |
| 30 | 16.05 | 48.16 | 18.06 | 1.00 | 1.00 | 6.02 | 6.02 | 1.51 | 1.51 | 0.67 |
| 31 | 13.91 | 53.64 | 15.89 | 0.99 | 0.99 | 5.96 | 5.96 | 1.49 | 0.50 | 0.67 |
| 32 | 13.77 | 45.25 | 19.67 | 0.98 | 0.98 | 5.90 | 9.84 | 1.48 | 1.48 | 0.65 |
| 33* | 13.91 | 61.59 | 11.92 | 0.99 | 0.99 | 5.96 | 0.99 | 1.49 | 1.49 | 0.67 |
| 34* | 14.74 | 40.00 | 25.26 | 1.05 | 2.46 | 6.32 | 6.32 | 1.58 | 1.58 | 0.69 |
| 35 | 14.05 | 50.17 | 18.06 | 1.00 | 1.00 | 6.02 | 6.02 | 1.51 | 1.51 | 0.66 |
| 36 | 13.82 | 53.29 | 15.79 | 0.99 | 0.99 | 5.92 | 5.92 | 1.48 | 1.48 | 0.32 |
| 37 | 13.77 | 45.25 | 19.67 | 0.98 | 0.98 | 9.84 | 5.90 | 1.48 | 1.48 | 0.65 |
| 38* | 13.67 | 56.63 | 13.67 | 0.98 | 0.98 | 5.86 | 5.86 | 0.24 | 1.46 | 0.65 |
| 39* | 13.50 | 52.09 | 15.43 | 2.89 | 0.96 | 5.79 | 5.79 | 1.45 | 1.45 | 0.65 |
| 40 | 14.05 | 50.17 | 18.06 | 1.00 | 1.00 | 6.02 | 6.02 | 1.51 | 1.51 | 0.66 |
| 41 | 12.10 | 48.40 | 20.17 | 2.52 | 1.01 | 6.05 | 6.05 | 1.51 | 1.51 | 0.68 |
| 42 | 11.69 | 54.55 | 15.58 | 0.97 | 1.95 | 5.84 | 5.84 | 1.46 | 1.46 | 0.66 |
| 43* | 12.71 | 46.60 | 23.30 | 1.06 | 1.06 | 6.35 | 6.35 | 1.59 | 0.26 | 0.72 |
| 44* | 12.61 | 46.23 | 23.12 | 1.05 | 1.05 | 6.30 | 6.30 | 1.58 | 1.56 | 0.18 |
| 45 | 12.54 | 45.99 | 23.00 | 1.05 | 1.05 | 6.27 | 6.27 | 1.57 | 1.57 | 0.69 |

In the above tables, the asterisk (*) mark provided on the Example number indicates comparative examples.

Then, the powders of those compounds were placed in a polyethylene pot together with an appropriate amount of water and mixed well in a wet state, followed by dehydrating and drying. The dried material was then calcined in air at 800 °C. for 2 hours, yielding a component material for a dielectric ceramic composition.

The component material for the dielectric ceramic composition was then placed in a polyethylene pot together with water and the mixture was then pulverized in a wet state into finely divided powder, followed by dehydrating and drying the resulting powdery mixture to yield a powdery raw material for a dielectric ceramic material.

To the resulting powdery raw material therefor was added an organic binder and the resulting mixture was granulated and molded under pressure at 500 kg/cm$^2$ into a molded disk having a diameter of 9.8 mm and a thickness of 0.6 mm.

The resulting disk was then placed on a zirconia setter and fired in air at a temperature between 850° C. and 920° C. as indicated in Tables 2-1 and 2-2 below to yield a ceramic element in a disk shape.

The resulting disk-shaped ceramic element was then subjected to analysis of a crystal phase by particle X-ray diffraction method. The results of analysis are shown in Tables 2-1 to 2-2 below.

The resulting disk-shaped ceramic element was then coated at its both surfaces with a silver paste and baked to form a ceramic capacitor with the baked ceramic element 10 interposed between a pair of two sheets of electrodes 12 and 12, as shown in FIG. 1. The resulting ceramic capacitor was measured for its relative dielectric constant $\epsilon r$, Q factor, and temperature coefficient $\tau \epsilon r$ (ppm/° C.) of the relative dielectric constant. The results of measurement are shown in Tables 2-1 and 2-2 below.

TABLE 2-1

| EX. NO. | X PHASE (MOL %) | Y PHASE (MOL %) | CONTENTS (MOL %) IN X-PHASE | | | | CONTENTS (MOL %) IN Y-PHASE | | | FIRING TEMP. (° C.) | $\epsilon$ | Q FACTOR | $\tau \epsilon$ ppm/° C. |
|---|---|---|---|---|---|---|---|---|---|---|---|---|---|
| | | | Bi | Pb | Zn | Si | B | Ag | Mn | | | | |
| 1 | 90 | BT4 | 2 | 3 | 6 | 6 | 3 | 3 | 2 | 910 | 70 | 1,300 | −20 |
| 2 | 79 | B4T13 | 2 | 3 | 6 | 6 | 3 | 3 | 2 | 900 | 58 | 1,420 | −8 |
| 3* | 99 | B2T9 | 2 | 3 | 6 | 6 | 3 | 3 | 2 | NOT SINTERED | | | |
| 4 | 80 | BT2 | 2 | 3 | 6 | 6 | 3 | 3 | 2 | 900 | 75 | 1,300 | 0 |
| 5 | 98 | BT4, B4T13 | 2 | 3 | 6 | 6 | 3 | 3 | 2 | 917 | 80 | 1,050 | −35 |
| 6 | 90 | BT4, B4T13, B2T9 | 1 | 3 | 6 | 6 | 3 | 3 | 2 | 910 | 60 | 1,550 | −10 |

TABLE 2-1-continued

| EX. NO. | X PHASE (MOL %) | Y PHASE (MOL %) | CONTENTS (MOL %) IN X-PHASE | | | | CONTENTS (MOL %) IN Y-PHASE | | | FIRING TEMP. (° C.) | $\epsilon$ | Q FAC-TOR | $\tau\epsilon$ ppm/° C. |
|---|---|---|---|---|---|---|---|---|---|---|---|---|---|
| | | | Bi | Pb | Zn | Si | B | Ag | Mn | | | | |
| 7 | 85 | BT4, B4T13 B2T9 | 2 | 3 | 6 | 6 | 3 | 3 | 2 | 905 | 72 | 1,400 | −15 |
| 8 | 85 | BT4, B2T9 | 1 | 1 | 2 | 2 | 1 | 1 | 1 | 910 | 64 | 1,500 | −10 |
| 9* | 85 | BT4, B4T13, BT2 | 2 | 3 | 6 | 6 | 3 | 3 | 6 | 902 | 47 | 1,500 | −5 |
| 10 | 85 | B4T13, BT4 | 2 | 3 | 6 | 6 | 3 | 3 | 2 | 905 | 65 | 1,450 | −15 |
| 11 | 95 | B4T13, B2T9, BT4 | 2 | 1 | 6 | 6 | 3 | 3 | 2 | 920 | 75 | 1,150 | −20 |
| 12 | 95 | B2T9, BT4 | 2 | 3 | 6 | 6 | 3 | 3 | 2 | 915 | 81 | 1,100 | −25 |
| 13 | 95 | BT4, B4T13, BT2 | 5 | 6 | 10 | 10 | 6 | 6 | 5 | 910 | 73 | 1,100 | −25 |
| 14* | 90 | BT4, B4T13, BT2 | 2 | 3 | 6 | 6 | 3 | 7 | 2 | 890 | 59 | 1,050 | −10 |
| 15 | 95 | BT4, B4T13, BT2 | 2 | 3 | 6 | 6 | 3 | 3 | 2 | 915 | 83 | 1,050 | −25 |
| 16 | 90 | BT4 | 2 | 3 | 2 | 6 | 3 | 3 | 2 | 915 | 75 | 1,400 | −25 |
| 17 | 90 | B4T13 | 2 | 3 | 6 | 6 | 3 | 3 | 5 | 905 | 70 | 1,220 | −15 |
| 18* | 90 | B2T9 | 0.5 | 3 | 6 | 6 | 3 | 3 | 2 | 917 | 57 | 1,550 | 0 |
| 19* | 85 | BT2 | 2 | 3 | 6 | 6 | 7 | 3 | 2 | 885 | 67 | 970 | 5 |
| 20 | 90 | BT4, B4T13 | 2 | 3 | 6 | 6 | 3 | 3 | 2 | 910 | 75 | 1,250 | −20 |

TABLE 2-2

| EX. NO. | X PHASE (MOL %) | Y PHASE (MOL %) | CONTENTS (MOL %) IN X-PHASE | | | | CONTENTS (MOL %) IN Y-PHASE | | | FIRING TEMP. (° C.) | $\epsilon$ | Q FAC-TOR | $\tau\epsilon$ ppm/° C. |
|---|---|---|---|---|---|---|---|---|---|---|---|---|---|
| | | | Bi | Pb | Zn | Si | B | Ag | Mn | | | | |
| 21 | 85 | BT4, B4T13, BT2 | 2 | 3 | 6 | 2 | 3 | 3 | 2 | 910 | 63 | 1,550 | −20 |
| 22 | 95 | BT4, B4T13, B2T9 | 2 | 3 | 6 | 6 | 3 | 6 | 2 | 910 | 71 | 1,000 | −20 |
| 23* | 85 | BT4, B2T9 | 2 | 0.5 | 6 | 6 | 3 | 3 | 2 | 910 | 55 | 1,650 | 0 |
| 24* | 85 | BT4, B2T9, B4T13 | 2 | 3 | 6 | 12 | 3 | 3 | 2 | 885 | 53 | 1,250 | −5 |
| 25 | 85 | BT4, B2T9 | 2 | 3 | 6 | 6 | 3 | 3 | 2 | 905 | 66 | 1,450 | −15 |
| 26 | 95 | B4T13, B2T9, BT4 | 2 | 3 | 6 | 6 | 1 | 3 | 2 | 920 | 90 | 1,150 | −30 |
| 27 | 95 | B2T9, BT4 | 2 | 3 | 6 | 6 | 6 | 3 | 2 | 910 | 71 | 1,000 | −20 |
| 28* | 95 | BT4, B4T13, B2T9 | 2 | 3 | 1 | 6 | 3 | 2 | 2 | NOT SINTERED | | | |
| 29* | 95 | BT4, B4T13, BT2 | 2 | 3 | 12 | 6 | 3 | 3 | 2 | 895 | 63 | 900 | −15 |
| 30 | 95 | BT4, B4T13, BT2 | 2 | 3 | 6 | 6 | 3 | 3 | 2 | 915 | 83 | 1,050 | −25 |
| 31 | 90 | BT4 | 2 | 3 | 6 | 6 | 3 | 1 | 2 | 915 | 75 | 1,400 | −25 |
| 32 | 90 | B4T13 | 2 | 3 | 6 | 10 | 3 | 3 | 2 | 905 | 70 | 1,100 | −15 |
| 33* | 90 | B2T9 | 2 | 3 | 6 | 1 | 3 | 3 | 2 | NOT SINTERED | | | |
| 34* | 90 | BT2 | 2 | 7 | 6 | 6 | 3 | 3 | 2 | 903 | 100 | 1,150 | −70 |
| 35 | 90 | BT4, B4T13 | 2 | 3 | 6 | 6 | 3 | 3 | 2 | 910 | 75 | 1,250 | −20 |
| 36 | 90 | BT4, B4T13, B2T9 | 2 | 3 | 6 | 6 | 3 | 3 | 1 | 912 | 75 | 1,200 | −25 |
| 37 | 90 | BT4, B4T13, BT2 | 2 | 3 | 10 | 6 | 3 | 3 | 2 | 905 | 69 | 1,150 | −15 |
| 38* | 90 | BT4, B2T9 | 2 | 3 | 6 | 6 | 0.5 | 3 | 2 | NOT SINTERED | | | |
| 39* | 90 | BT4, B2T9, B4T13 | 6 | 3 | 6 | 6 | 3 | 3 | 2 | 903 | 80 | 1,150 | −65 |
| 40 | 90 | B4T13, BT4 | 2 | 3 | 6 | 6 | 3 | 3 | 2 | 910 | 70 | 1,300 | −20 |
| 41 | 85 | B4T13, BT4 | 5 | 3 | 6 | 6 | 3 | 3 | 2 | 900 | 82 | 1,280 | −20 |
| 42 | 85 | B2T9, BT4 | 2 | 6 | 6 | 6 | 3 | 3 | 2 | 900 | 77 | 1,330 | −20 |
| 43* | 55 | BT4, B4T13, BT2 | 2 | 3 | 6 | 6 | 3 | 0.5 | 2 | NOT SINTERED | | | |
| 44* | 85 | BT4, B4T13, BT2 | 2 | 3 | 6 | 6 | 3 | 3 | 0.5 | 908 | 75 | 960 | −25 |
| 45 | 85 | BT4, B4T13, BT2 | 2 | 3 | 6 | 6 | 3 | 3 | 2 | 905 | 72 | 1,350 | −15 |

In the above tables, the asterisk (*) mark added to the Example number indicates comparative examples and it is outside the limits defined limits of the present invention. Under the columns entitled "X phase" and "Y phase" as well as "Contents (mol %) in X-Phase" and "Contents (mol %) in Y-Phase", the terms "X phase" and "Y phase" referred to therein are meant to indicate "the crystal structure phase of the tungsten bronze form" and "the fine crystal phase", respectively. Under the column entitled "Contents (mol %) in X-Phase", the term "BT2" referred to therein means "BaTi$_2$O$_5$", the term "B4T13" referred to thereinmeans "Ba$_4$Ti$_{13}$O$_{30}$", the term "BT4" referred to therein means "BaTi$_4$O$_9$", and the term "B2T9" referred to therein means "Ba$_2$Ti$_9$O$_{20}$".

The relative dielectric constant $\epsilon$r and the Q factor were measured under the conditions at frequency of 1 MHz, 1 V and ambient temperature of 20° C. The temperature coefficient $\tau\epsilon$r (ppm/° C.) of the relative dielectric constant $\epsilon$r was referred to herein as a variation rate of the relative dielectric constant $\epsilon$r at the temperature range of +20° C. to +85° C. relative to the relative dielectric constant $\epsilon$r at the temperature of +20° C. and was measured at 1 MHz and 1 V.

A review will now be made of the results of the examples as indicated in Tables 2-1 and 2-2 above.

First, a description will be made of a rate of the crystal structure phase of the tungsten bronze form.

The results of the examples indicated above reveal that the rate of X is preferably set to the range of from 80% to 98% by mole because the dielectric constant may become smaller than 60 as shown in Example No. 2, on the one hand, when the rate of X is set to less than 80% by mole and the composition cannot be sintered by firing at a temperature of 920° C. or lower as shown in Example No. 3, when the rate of the X phase is set to greater than 98% by mole.

Then, a description will be made of the rate of the oxide of Bi contained in the crystal structure phase of the tungsten bronze form. The above tables reveal that the rate of the Bi oxide therein is preferably set to the range of from 1% to 5% by mole because the dielectric constant may not become 60 or higher as shown in Example No. 18, on the one hand, when the rate of the Bi oxide is set to less than 1% by mole and the temperature feature of the dielectric constant, τϵ, may not become in the range of plus minus ±60 ppm/° C. as shown in Example No. 39, on the other, when the rate of the Bi oxide is set to greater than 5% by mole.

A description will now turn to the rate of the oxide of Pb contained in the crystal structure phase of the tungsten bronze form. The above tables reveal that the rate of the Pb oxide therein is preferably in the range of from 1% to 6% by mole because the dielectric constant may reach 60 or higher as shown in Example No. 23, on the one hand, when the rate of the Pb oxide is set to less than 1% by mole and the temperature feature of the dielectric constant, τϵ, may bot become in the range of ±60 ppm/° C. as shown in Example No. 34, on the other, when the rate of the Bi oxide is set to greater than 6% by mole.

A further description will be made of the rate of the oxide of Zn contained in the crystal structure phase of the tungsten bronze form. The above tables reveal that the rate of the Zn oxide therein is preferably set to the range of from 2% to 11% by mole because, when the rate of the Zn oxide is set to less than 2% by mole as shown in Example No. 28, on the one hand, the composition may not be sintered by firing at a temperature of 920° C. or lower and, when the rate of the Zn oxide is set to greater than 11% by mole as shown in Example No. 12, on the other, the dielectric constant may not reach 60 or higher and the Q factor may not become 1,000 or greater.

A still further description will be made of the rate of the oxide of Si contained in the crystal structure phase of the tungsten bronze form. The above tables reveal that the rate of the Si oxide therein is preferably set to the range of from 2t to 11% by mole because the composition may not be sintered by firing at a temperature of 920° C. or lower, on the one hand, when the rate of the Si oxide is set to less than 2% by mole, as shown in Example No. 33, and the dielectric constant may not reach 60 or higher and the Q factor may not become 1,000 or greater, on the other, when the rate of the Si oxide is set to greater than 11% by mole, as shown in Example No. 24.

Then, a review will be made of the rate of the B oxide forming the fine crystal phase. The tables indicated above reveal that the rate of the B oxide in the fine crystal phase is preferably set to the range of from 1% to 6% by mole because the composition may not be sintered by firing at a temperature of 920° C. or lower, on the one hand, when the rate of the B oxide is set to less than 1% by mole, as shown in Example No. 38, and the dielectric constant may not reach 60 or higher and the Q factor may not become 1,000 or greater, on the other, when the rate of the B oxide is set to greater than 6% by mole, as shown in Example No. 19.

A further description will be made of the rate of the Ag oxide contained in the fine crystal phase. The above tables reveal that the rate of the Ag oxide therein is preferably set to the range of from 1% to 6% by mole because, when the rate of the Ag oxide is set to less than 1% by mole as shown in Example No. 43, on the one hand, the composition may not be sintered by firing at a temperature of 920° C. or lower and, when the rate of the Ag oxide is set to greater than 6% by mole as shown in Example No. 14, on the other, the dielectric constant may not reach 60 or higher and the Q factor may not become 1,000 or greater.

Still further, a review on the rate of the Mn oxide contained in the fine crystal phase will be made. In the above tables, it is revealed that the rate of the Mn oxide therein is preferably set to the range of from 1% to 5% by mole because, when the rate of the Mn oxide is set to less than 1% by mole as shown in Example No. 44, on the one hand, the Q factor may not become 1,000 or greater and, when the rate of the Mn oxide is set to greater than 5% by mole as shown in Example No. 9, on the other, the dielectric constant may not reach 60 or higher.

It is to be noted herein that, although a specific description of the dielectric ceramic composition according to the present invention is made for comparison of the features of the dielectric ceramic composition according to the present invention by taking the disk-shaped capacitor as an example for brevity of explanation, it is apparent multi-layered capacitors, filters, resonators and the like can achieve substantially the same results as the disk-shaped capacitor.

It is further to be noted herein that, although the component compounds are used in the oxide form, they are not limited to the oxide forms and they may be used in the form of a hydroxide of a rare earth metal, an oxalate, a titanate or the like, in place of the oxides. In such a case, dielectric ceramic compositions having substantially the same effects may be provided.

Moreover, the dielectric ceramic composition according to the present invention may be formed into a variety of parts including antenna boards, high frequency circuit boards, resonator parts, and the like, in addition to the parts such as capacitors, filters and so on.

EFFECTS OF THE INVENTION

Given the description and review on the results of the examples where the components are defined at the rates as described above, it is found that the present invention can provide a dielectric ceramic composition which has remarkably high dielectric characteristics, such as the dielectric constant of 60 or higher, the Q factor of 1,000 or higher, and the temperature coefficient τϵr of the relative dielectric constant ϵr of ±60 ppm/° C. or smaller, and which can be sintered by firing at a temperature lower than 920° C.

Further, the dielectric ceramic composition according to the present invention can achieve the effects that ceramic electronic parts for high frequency having high electrical features can be prepared at low costs because the dielectric ceramic composition with various electrical characteristics suitable for ceramic electronic parts for high frequency can be sintered by firing at a temperature as low as 920° C. or lower.

What is claimed is:

1. A dielectric ceramic composition comprising a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn; wherein:

said crystal structure phase of the tungsten bronze form comprises a compound oxide of Ba, Nd and Ti as a basic component and contains an oxide of at least Bi, Pb, Zn and Si;

a rate of said crystal structure phase of the tungsten bronze form, when represented in X% by mole, is: X=80% to 98% by mole, assuming that the rate of said titanate-barium phase is represented in Y% by mole and that the total of X% and Y% by mole is set to 100% by mole;

a rate of a Bi oxide contained in said crystal phase of the tungsten bronze form is from 1% to 5% by mole; a rate of a Pb oxide contained therein is from 1% to 6% by mole; a rate of a Zn oxide contained therein is from 2% to 11% by mole; and a rate of a Si oxide contained therein is from 2% to 11% by mole; and a rate of a B oxide forming said fine crystal phase is from 1% to 6% by mole with respect to a total amount of said crystal structure phase of the tungsten bronze form and said titanate-barium phase; a rate of a Ag oxide forming said fine crystal phase is from 1% to 6% by mole with respect thereto; and a rate of a Mn oxide forming said fine crystal phase is from 1% to 5% by mole with respect thereto.

2. The dielectric ceramic composition as claimed in claim 1, wherein a basic configuration of said crystal structure phase of the tungsten bronze form is comprised of $BaNd_2Ti_4O_{12}$ or $BaNd_2Ti_5O_{12}$.

3. A ceramic electronic part formed with a dielectric ceramic composition comprising a crystal structure phase of a tungsten bronze form, one titanate-barium phase or more titanate-barium phases selected from $Ba_2Ti_9O_{20}$, $BaTi_2O_5$, $BaTi_4O_9$ and $Ba_4Ti_{13}O_{30}$, and a fine crystal phase comprising an oxide of each of at least B, Ag and Mn; wherein:

said crystal structure phase of the tungsten bronze form comprises a compound oxide of Ba, Nd and Ti as a basic component and contains an oxide of at least Bi, Pb, Zn and Si;

a rate of said crystal structure phase of the tungsten bronze form, when represented in X% by mole, is: X=80% to 98% by mole, assuming that the rate of said titanate-barium phase is represented in Y% by mole and that the total of X% and Y% by mole is set to 100% by mole;

a rate of a Bi oxide contained in said crystal structure phase of the tungsten bronze form is from 1% to 5% by mole; a rate of a Pb oxide contained therein is from 1% to 6% by mole; a rate of a Zn oxide contained therein is from 2% to 11% by mole; and a rate of a Si oxide contained therein is from 2% to 11% by mole; and a rate of a B oxide forming said fine crystal phase is from 1% to 6% by mole with respect to a total amount of said crystal structure phase of the tungsten bronze form and said titanate-barium phase; a rate of a Ag oxide forming said fine crystal phase is from 1% to 6% by mole with respect thereto; and a rate of a Mn oxide forming said fine crystal phase is from 1% to 5% by mole with respect thereto.

* * * * *